2,920,104
STABILIZED SOLUTIONS OF A DITHIOCARBAMATE

Lester A. Brooks, East Norwalk, and Irving Gibbs, Norwalk, Conn., assignors to R. T. Vanderbilt Company, Inc., New York, N.Y., a corporation of New York No Drawing. Application July 1, 1958
Serial No. 745,838

4 Claims. (Cl. 260—500)

The present invention pertains to a dithiocarbamate, and more particularly to aqueous solutions of sodium dibutyl dithiocarbamate which are stabilized against decomposition during storage or ageing thereof.

Aqueous solutions of sodium dibutyl dithiocarbamate are useful as accelerators for the vulcanization of natural rubber and synthetic rubber latices. The solutions, however, decompose during storage because of oxygen dissolved therein with the resultant formation of a water-insoluble oxidation product, namely tetrabutyl thiuram disulfide, which appears as a haze or as distinct oily droplets. The oxidative decomposition of the dithiocarbamate reduces its activity or efficiency as an accelerator for the vulcanization of latices. Also, the presence of the water-insoluble decomposition product is not appreciated by latex compounders who are inclined to reject such decomposed solutions.

It has been proposed heretofore in U.S. Patent No. 2,665,285 to inhibit the decomposition of aqueous solutions of salts of dialkyl dithiocarbamic acids by adding thereto a minor amount of an inorganic sulfite. It has also been proposed in U.S. Patent No. 2,806,870 to inhibit the decomposition of manganous dimethyl dithiocarbamate by admixing therewith a small amount of thiourea. However, neither inorganic sulfites nor thiourea are satisfactory in stabilizing aqueous solutions of sodium dibutyl dithiocarbamate against decomposition on storage.

Accordingly, it is the object of the present invention to provide aqueous solutions of sodium dibutyl dithiocarbamate which remain stable during storage without the formation of a water-insoluble decomposition product.

In accordance with the present invention, aqueous solutions of sodium dibutyl dithiocarbamate are stabilized by incorporating hydrazine therein.

The concentration of the sodium dibutyl dithiocarbamate in the aqueous solutions may vary within a large range. In general, the aqueous solution contains from about 25% to about 50% by weight of sodium dibutyl dithiocarbamate, and preferably about 50% thereof.

Hydrazine is incorporated in the aqueous solution of sodium dibutyl dithiocarbamate in an amount sufficient to stabilize the solution against decomposition on ageing or storage and thereby prevent the formation of water-insoluble decomposition products of the dithiocarbamate. The amount of hydrazine which is used is small and in general the amount lies in the range from about 0.25% to about 0.5% of hydrazine based on the weight of the sodium dibutyl dithiocarbamate. Larger amounts of hydrazine may be used, if desired, although such larger amounts add little to the stability of the aqueous solutions of sodium dibutyl dithiocarbamate.

Aqueous solutions of sodium dibutyl dithiocarbamate may be prepared in the conventional manner of preparing water-soluble salts of dialkyl dithiocarbamic acids. Thus, an aqueous solution of sodium dibutyl dithiocarbamate can be prepared by reacting dibutyl amine, carbon disulfide and sodium hydroxide in an aqueous medium.

The stabilized aqueous solutions of sodium dibutyl dithiocarbamate may be prepared merely by adding the hydrazine to the aqueous solutions of the sodium dibutyl dithiocarbamate. The hydrazine should be added to the solutions of sodium dibutyl dithiocarbamate within a few minutes of their preparation in order to obtain maximum protection against oxidation.

The stabilized compositions of the invention will be further illustrated in connection with the following examples.

Example 1

In a one liter beaker there was placed 82 grams of 52.6% sodium hydroxide solution together with 175 grams of water and 129.24 grams of dibutyl amine. The solution was cooled to 25° C.–30° C. and there was then added thereto with stirring 76 grams of carbon disulfide. The temperature was not allowed to rise above 35° C. during the addition of the carbon disulfide. When the addition of carbon disulfide was completed, the mixture was stirred for a few minutes longer. Then 0.89 gram of 64% active hydrazine was added to give 0.25% of hydrazine based on the weight of sodium dibutyl dithiocarbamate. The final solution of sodium dibutyl dithiocarbamate was clear and had a pale yellow color. When 10 cc. of the solution was diluted to 100 cc. with distilled water, a clear solution was obtained which was free from any haze after standing for 10 minutes.

A similarly prepared dilute solution of sodium dibutyl dithiocarbamate which did not contain hydrazine developed a distinct haze and an obnoxious odor after standing for 10 minutes.

Examples 2 through 8

Twenty-five percent aqueous solutions of sodium dibutyl dithiocarbamate were prepared and to different solutions there were separately added sodium sulfite, thiourea, and hydrazine respectively in the amounts set forth below. The stability of the solutions was observed at the end of a one-month storage period.

| Example No. | Weight and identity of additive present in 25% aqueous solution of sodium dibutyl dithiocarbamate | Percent additive based on the weight of the sodium dibutyl dithiocarbamate | Appearance of the solution at the end of a one-month storage period |
| --- | --- | --- | --- |
| 2 | none | none | cloudy-oily droplets. |
| 3 | 0.25 g. sodium sulfite | 1.00 | Do. |
| 4 | 0.125 g. sodium sulfite | 0.50 | Do. |
| 5 | 0.25 g. thiourea | 1.00 | Do. |
| 6 | 0.125 g. thiourea | 0.50 | Do. |
| 7 | 0.125 g. hydrazine | 0.50 | clear. |
| 8 | 0.0625 g. hydrazine | 0.25 | Do. |

The data set forth in Example 2 above show that an aqueous solution of sodium dibutyl dithiocarbamate decomposes on ageing, with the formation of water-insoluble oily droplets of tetrabutyl thiuram disulfide. Examples 3 through 6 demonstrate the fact that aqueous solutions of sodium dibutyl dithiocarbamate containing from 0.5% to 1% of sodium sulfite or thiourea based on the weight of the sodium dibutyl dithiocarbamate also decompose on ageing in spite of the fact that sodium sulfite and thiourea have been proposed heretofore for use in stabilizing certain dithiocarbamates against oxidative decomposition. However, when from about 0.25% to about 0.5% of hydrazine based on the weight of sodium dibutyl dithiocarbamate is added to an aqueous solution of this dithiocarbamate, there is obtained a solution which remains stable against oxidative decomposition over a long period without the formation of a water-insoluble product as shown by the data in Examples 7 and 8.

It will be appreciated that various modifications and changes may be made in the compositions of the invention without departing from the spirit thereof and accordingly the invention is to be limited only within the scope of the appended claims.

We claim:

1. An aqueous solution of sodium dibutyl dithiocarbamate containing an amount of hydrazine sufficient to stabilize the solution against decomposition on ageing.

2. A clear, stabilized aqueous solution of sodium dibutyl dithiocarbamate containing a small amount of hydrazine.

3. A clear, stabilized aqueous solution containing from about 25% to about 50% of sodium dibutyl dithiocarbamate and from about 0.25% to about 0.5% of hydrazine based on the weight of the dithiocarbamate.

4. A clear, stabilized aqueous solution containing about 50% of sodium dibutyl dithiocarbamate and from about 0.25% to about 0.5% of hydrazine based on the weight of the dithiocarbamate.

References Cited in the file of this patent

UNITED STATES PATENTS 2,791,605     Dorman et al. _____ May 7, 1957